Oct. 23, 1956  F. E. JOHNSON  2,767,454

SNAP FASTENER SOCKET

Filed Dec. 30, 1952

INVENTOR:
FRANK E. JOHNSON,
BY Robert E. Ross
ATTORNEY.

US Patent Office 2,767,454
Patented Oct. 23, 1956

2,767,454

SNAP FASTENER SOCKET

Frank E. Johnson, Abington, Mass., assignor, by mesne assignments, to United-Carr Fastener Corporation, Boston, Mass., a corporation of Delaware Application December 30, 1952, Serial No. 328,695

1 Claim. (Cl. 24—216)

This invention relates generally to fastening devices, and has particular reference to a snap fastener socket.

The object of the invention is to provide a snap fastener socket of the three-side-lock type which is not rendered inoperative by the presence of mud, sand or the like.

A further object of the invention is to provide a snap fastener socket of the three-side-lock type in which the snap action is provided by a spring member integral with the socket.

Other objects of the invention will, in part, be obvious and will, in part, appear hereinafter.

Figure 1:
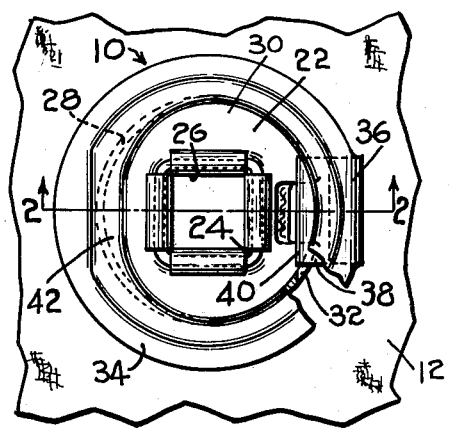
Fig. 1 is a top plan view of a snap fastener socket embodying the features of the invention.
Figure 2:
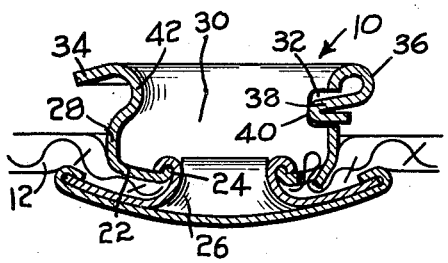
Fig. 2 is a view in section taken on line 2—2 of Fig. 1.
Figure 3:
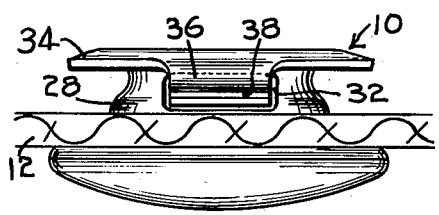
Fig. 3 is a view of the socket of Fig. 2 as seen from the right side.
Figure 4:
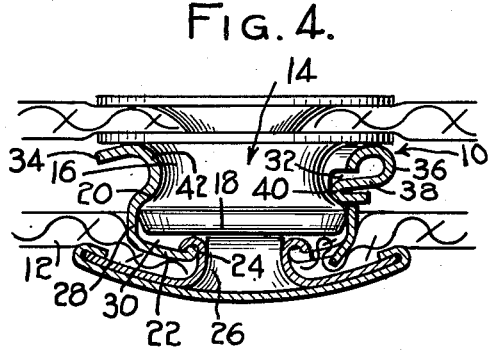
Fig. 4 is a view in elevation, partly in section, of the socket with a stud assembled therein.

Referring to the drawing, there is illustrated a snap fastener socket 10 attached to a supporting sheet 12, for receiving a stud 14 in snapping engagement.

The stud 14 comprises a reduced neck 16 and an enlarged head 18 forming a shoulder 20.

The socket 10, in the embodiment illustrated in Figs. 1-4, is of the three-side-lock type, that is, an assembled stud can be removed from the socket only by a separating force applied to one predetermined side of the assembly, and comprises generally a base 22 having a central opening 24 for receiving an attaching rivet 26 and a peripheral upstanding wall 28 forming a stud-receiving cavity 30.

The wall 28 is provided with an elongated slot 32 which is disposed in spaced relation to the base on one side of the socket. A peripheral flange 34 is provided about this upper edge of the wall, and to provide means for engaging the stud in snapping engagement, an integral resilient tongue 36 is disposed on the flange over the slot 32 and is curled downwardly and inwardly and terminates in a free end 38 extending through the slot and projecting into the stud-receiving cavity a predetermined distance for snapping engagement with an inserted stud. The free end 38 is preferably turnd back on itself to provide a smoothly rounded outer surface 40.

To provide means for imparting a three-side-lock feature to the socket, a portion of the wall on the side of the socket opposite the slot is embossed inwardly in spaced relation to the base to form a stud locking projection 42, which extends an appreciable distance circumferentially and is faired gradually into the socket wall.

The stud 14 is assembled into the socket 10 by tilting the stud into the socket so that the shoulder 20 passes below the locking projection 42. The opposite side of the stud is then pushed downwardly so that the shoulder 20 snaps past the free end 38, which springs outwardly to allow the enlarged head to pass into the socket. (See Fig. 4).

Thereafter, the stud may be removed from the socket by separating forces applied on the side having the tongue 36; however, disassembly by separating forces applied on the opposite side is prevented by the engagement of the stud locking projection 42 with the enlarged head of the stud.

Figure 5:
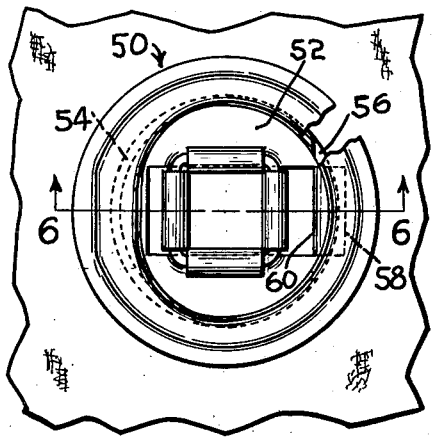
Fig. 5 is a top plan view of a modified form of socket embodying the features of the invention.
Figure 6:
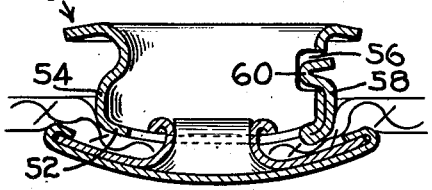
Fig. 6 is a view in section taken on line 6—6 of Fig. 5.

Referring now to Figs. 5 and 6, there is illustrated a modified form of socket 50 embodying the features of the invention and comprising a base 52 with an upstanding peripheral wall 54, having an elongated slot 56 disposed therein. To provide means for snapping engagement with an inserted stud, a tongue 58 is formed from the base and extends upwardly outside the wall 54, with an inwardly projecting free end portion 60 disposed in the slot 56 and extending therethrough. The socket 50 is otherwise similar to the socket 10 and engages a stud in a similar manner.

The illustrated socket is particularly adapted for use in situations where the fastener is likely to become saturated with mud or sand, since the presence of such contaminates cannot possibly jam the spring and lock the stud in the socket.

Since certain obvious modifications may be made in the device without departing from the scope of the invention, it is intended that all matter contained herein be interpreted in an illustrative and not in a limiting sense.

I claim:

A snap fastener socket for receiving a shouldered stud in snapping engagement, comprising a socket body having a base and a peripheral upstanding wall on the base forming a stud receiving cavity, said wall having a slot disposed therein on one side of the socket extending generally parallel to the base in spaced relation thereto, and a radially extending flange at the upper end of the wall, and an integral tongue joined to the flange directly above the slot, said tongue having an outwardly and downwardly curled portion and an end portion projecting into the stud receiving cavity through the slot for snapping engagement with an inserted stud.

References Cited in the file of this patent

UNITED STATES PATENTS

| | | |
|---|---|---|
| 1,598,691 | Powell | Sept. 7, 1926 |
| 2,648,885 | Jones | Aug. 18, 1953 |

FOREIGN PATENTS

| | | |
|---|---|---|
| 487,216 | France | Mar. 22, 1918 |